United States Patent
Lou

(10) Patent No.: US 12,358,086 B1
(45) Date of Patent: Jul. 15, 2025

(54) ASSEMBLY STATION AND PROCESS FOR EVAPORATOR AND CONDENSER ON CLIMATIC CONDITIONING CABINET

(71) Applicant: FORYS (CHONGQING) AUTOMATION EQUIPMENT CO., LTD, Chongqing (CN)

(72) Inventor: Yipan Lou, Chongqing (CN)

(73) Assignee: FORYS (CHONGQING) AUTOMATION EQUIPMENT CO., LTD, Chongqing (CN)

( * ) Notice: Subject to any disclaimer, the term of this patent is extended or adjusted under 35 U.S.C. 154(b) by 0 days.

(21) Appl. No.: 18/806,877

(22) Filed: Aug. 16, 2024

Related U.S. Application Data

(63) Continuation of application No. PCT/CN2024/092293, filed on May 10, 2024.

(30) Foreign Application Priority Data

Apr. 3, 2024 (CN) .......................... 202410397940.2

(51) Int. Cl.
  *B23P 19/00* (2006.01)
  *B23P 21/00* (2006.01)

(52) U.S. Cl.
  CPC ........... *B23P 19/007* (2013.01); *B23P 21/004* (2013.01)

(58) Field of Classification Search
  CPC ......... B23P 19/007; B23P 19/06; B23P 19/04; B23P 21/004; B23P 21/00
  See application file for complete search history.

(56) References Cited

FOREIGN PATENT DOCUMENTS

| | | | | | |
|---|---|---|---|---|---|
| CN | 210499168 | U | * | 5/2020 | .............. B23P 21/00 |
| CN | 115464383 | A | * | 12/2022 | ............ B23P 19/001 |
| CN | 116175152 | A | * | 5/2023 | |
| JP | 2004239456 | A | * | 8/2004 | |
| JP | 2004301499 | A | * | 10/2004 | ............. B23K 3/087 |

OTHER PUBLICATIONS

International Search Report received in corresponding International Patent Application No. PCT/CN2024/092293, mailed Jul. 23, 2024, 10 pages.

* cited by examiner

*Primary Examiner* — Bayan Salone
(74) *Attorney, Agent, or Firm* — Cooper Legal Group, LLC

(57) ABSTRACT

An assembly station and process for evaporator and condenser on a climatic conditioning cabinet includes a manipulator and a connection assembly. The connection assembly includes a pipe clamping element, a hexagon nut tightening unit and a compression element for sponge. The pipe clamping element includes a thirty-ninth air cylinder, a fortieth air cylinder at a telescopic end of the thirty-ninth air cylinder, a second upper clamping block on a cylinder body of the fortieth air cylinder and a second lower clamping block at a telescopic end of the fortieth air cylinder which may clamp pipes of the evaporator and the condenser. The hexagon nut tightening unit includes a forty-fourth air cylinder and a second screw gun at a telescopic end of the forty-fourth air cylinder, and the second screw gun may tighten a nut on a connection between the evaporator and the condenser.

10 Claims, 11 Drawing Sheets

ASSEMBLY STATION AND PROCESS FOR EVAPORATOR AND CONDENSER ON CLIMATIC CONDITIONING CABINET

CROSS-REFERENCE TO RELATED APPLICATION

This application is a continuation of PCT application serial no. PCT/CN2024/092293, filed on May 10, 2024, which claims the priority and benefit of Chinese patent application serial no. 202410397940.2, filed on Apr. 3, 2024. The entireties of PCT application serial no. PCT/CN2024/092293 and Chinese patent application serial no. 202410397940.2 are hereby incorporated by reference herein and made a part of this specification.

TECHNICAL FIELD

The present application relates to the technical field of automobile assembly, and in particular, to an assembly station and process for evaporator and condenser on a climatic conditioning cabinet.

BACKGROUND ART

During the assembly of a climatic conditioning cabinet of an automobile, it is necessary to assemble an evaporator and a condenser in corresponding cavities of the climatic conditioning cabinet. After the evaporator and the condenser are installed in the climatic conditioning cabinet, it is necessary to coat the connection between the pipe of the evaporator and the pipe of the condenser with a soft foam material. Both the evaporator and the condenser have thinner and longer pipes. During the assembly, there is often a relative great error on a relative position between the pipe of the evaporator and the pipe of the condenser, which will make it different to fit the soft foam material to the pipe joints of the evaporator and the condenser, thereby resulting in a decreased assembly quality of the evaporator and condenser on the climatic conditioning cabinet.

SUMMARY

In order to improve the assembly quality of evaporator and condenser on an air conditioner, the present application provides an assembly station and process for evaporator and condenser on a climatic conditioning cabinet.

An assembly station for evaporator and condenser on a climatic conditioning cabinet provided by the present application adopts following technical solutions.

In a first aspect, the present application provides an assembly station for evaporator and condenser on a climatic conditioning cabinet.

The assembly station for evaporator and condenser on the climatic conditioning cabinet includes an operation frame body, and a manipulator, an assembly line, an assembly part for evaporator and a connection assembly for a pipe head of the evaporator and a pipe head of the condenser on the operation frame body.

The manipulator includes a mechanical arm on the operation frame body, and a gripper for evaporator and a component for assembling condenser which are provided on the mechanical arm, and the assembly line is configured to convey the climatic conditioning cabinet.

The connection assembly for the pipe head of the evaporator and the pipe head of the condenser includes a pipe clamping element of the evaporator and condenser, a hexagon nut tightening unit and a compression element for sponge.

The pipe clamping element of the evaporator and condenser includes a thirty-ninth air cylinder, a fortieth air cylinder, a second upper clamping block and a second lower clamping block, the thirty-ninth air cylinder is disposed on the operation frame body and extends toward the assembly line, the fortieth air cylinder extends vertically downwards and is disposed at a telescopic end of the thirty-ninth air cylinder, the second upper clamping block is disposed on a cylinder body of the fortieth air cylinder, the second lower clamping block is disposed at a telescopic end of the fortieth air cylinder, and the second upper clamping block and the second lower clamping block are configured to clamp a pipe of the evaporator and a pipe of the condenser.

The hexagon nut tightening unit includes a forty-fourth air cylinder on the operation frame body and a second screw gun at a telescopic end of the forty-fourth air cylinder, an extension or retraction direction of the telescopic end of the forty-fourth air cylinder is configured to be consistent with an extension or retraction direction of the telescopic end of the thirty-ninth air cylinder, and the second screw gun is configured to tighten a nut on a connection between a pipe head of the evaporator and a pipe head of the condenser.

The compression element for sponge is configured to compress a sponge against the connection between the pipe head of the evaporator and the pipe head of the condenser.

By adopting the above-mentioned technical solution, when assembling the evaporator and the condenser, firstly, the climatic conditioning cabinet is conveyed to the assembly station by the assembly line, then the mechanical arm rotates, the evaporator is clamped by the gripper for evaporator and the condenser is clamped by the component for assembling condenser. After that, the evaporator clamped by the gripper for evaporator is installed on the climatic conditioning cabinet by the assembly part for evaporator, and the condenser is installed on the climatic conditioning cabinet by the component for assembling condenser. Then the telescopic end of the thirty-ninth air cylinder extends out while the telescopic end of the fortieth air cylinder retracts, the pipe of the evaporator and the pipe of the condenser are clamped by the second upper clamping block and the second lower clamping block, after that, the telescopic end of the forty-fourth air cylinder extends out, and the nut is tightened on the connection between the pipe head of the evaporator and the pipe head of the condenser by the second screw gun. Finally, the sponge is compressed against the connection between the pipe head of the evaporator and the pipe head of the condenser by the compression element for sponge, and thus, the evaporator and condenser are mounted.

In the above-mentioned process, during connecting the pipe head of the evaporator and the pipe head of the condenser, the pipes may be limited by the second upper clamping block and the second lower clamping block, which reduces the excessive offset of the relative position between the pipes of the evaporator and condenser, thereby ensuring the assembly accuracy, and improving the assembly quality of the evaporator and condenser on the air conditioner.

According to the present disclosure, when the evaporator is assembled, a slider of a fifth linear guide rail slides, and a telescopic end of a thirtieth air cylinder extends out, so as to move the positioning plate to be close to the evaporator. Then, telescopic ends of a thirty-first air cylinder and a thirty-second air cylinder extend out, such that an upper guide plate and a lower guide plate are close to each other, and thus the upper guide plate abuts against an upper side of the evaporator while the lower guide plate abuts against a lower side of the evaporator, thereby achieving the assembly positioning for the evaporator, to effectively ensure the assembly accuracy of the evaporator.

In addition, when the evaporator is assembled, a telescopic end of a thirty-third air cylinder retracts, a telescopic end of a thirty-fourth air cylinder extends out, and a slider of a sixth linear guide rail drives a lateral guide plate to slide, such that the lateral guide plate guides and abuts against a side wall of one side of the evaporator, and thus, the assembly accuracy of the evaporator is further improved.

According to the present disclosure, when the condenser is assembled, telescopic ends of a thirty-sixth air cylinder, a thirty-seventh air cylinder and a thirty-eighth air cylinder extend out, such that the guide plates for condenser may abut against each side wall of the condenser, respectively, thereby limiting the assembly position of the condenser, and thus ensuring the assembly accuracy of the condenser.

In the technical solution of the present disclosure, telescopic ends of a fourth air cylinder and a fifth air cylinder may abut against the evaporator in a first positioning frame when extending out, so as to secondarily position the evaporator, to ensure a more accurate clamping position during assembly, and thus improving the assembly accuracy of the evaporator.

Telescopic ends of a sixth air cylinder and a seventh air cylinder may abut against the condenser in a second positioning frame when extending out, so as to secondarily position the condenser, to ensure a more accurate clamping position during assembly, thus improving the assembly accuracy of the condenser.

According to the present disclosure, the evaporator may be temporarily stored on a rack for evaporator, and the condenser may be stored on a rack for condenser, which facilitates taking the evaporator and the condenser at any time, thereby improving the convenience during the assembly of the evaporator and condenser.

In addition, when the evaporator is assembled, a telescopic end of a twenty-fourth air cylinder and a telescopic end of a twenty-fifth air cylinder correspondingly extend or retract, to adjust the position of a twenty-sixth air cylinder, and then, a telescopic end of the twenty-sixth air cylinder extends out, such that the evaporator clamped by a third clamping jaw may be installed on the climatic conditioning cabinet. The evaporator on the third clamping jaw is acquired by a gripper for evaporator.

Moreover, a telescopic end of a third air cylinder may drive a second clamping jaw to extend out when extending out, then the condenser may be gripped by the second clamping jaw.

After the mechanical arm moves to the climatic conditioning cabinet, the condenser may be installed on a corresponding position of the climatic conditioning cabinet.

In a second aspect, the present application provides an assembly process for evaporator and condenser on a climatic conditioning cabinet, including the following steps:
  after conveying the climatic conditioning cabinet to an assembly station by an assembly line, providing square nuts by a vibration feeding part for square nut and mounting the square nuts on the climatic conditioning cabinet by a fifth clamping jaw, then clamping an evaporator and conveying the evaporator to a secondary positioning part by a first clamping jaw for evaporator for secondary positioning, after that, clamping the evaporator and conveying the evaporator to an assembly part for evaporator by the first clamping jaw, and then horizontally pushing the evaporator into the climatic conditioning cabinet by the assembly part for evaporator, where the evaporator is guided by a plurality of auxiliary assembly parts for evaporator during the pushing;
  providing pipe clamps by a vibration feeding part for pipe clamp, driving bolts into the climatic conditioning cabinet by a first screw gun, so that a pipe of the evaporator is positioned by the pipe clamps, then clamping a condenser and conveying the condenser to a secondary positioning part for condenser by a second clamping jaw for secondary positioning, and after that, clamping and pushing the condenser to the climatic conditioning cabinet by the second clamping jaw, where the condenser is guided by a guide unit for condenser during the pushing; and
  clamping the pipe of the condenser and the pipe of the evaporator by a pipe clamping element of the evaporator and condenser, mounting hexagon nuts to the connection between the pipe of the evaporator and the pipe of the condenser by a second screw gun, and then compressing a sponge against the connection between the pipe of the evaporator and the pipe of the condenser by a compression element for sponge.

In conclusion, the present application includes the beneficial technical effects: the pipes of the evaporator and the condenser may be clamped and limited by the pipe clamping element of the evaporator and condenser in a process that the evaporator and the condenser are assembled, thereby reducing errors between the pipes of the evaporator and the condenser, and thus being beneficial to the improvement of the assembly quality of the evaporator and condenser on the air conditioner.

DETAILED DESCRIPTION

The present application will be further described in detail below in conjunction with accompanying drawings 1 to 16.

The present application discloses an assembly station and process for evaporator and condenser on a climatic conditioning cabinet.

Figure 1:
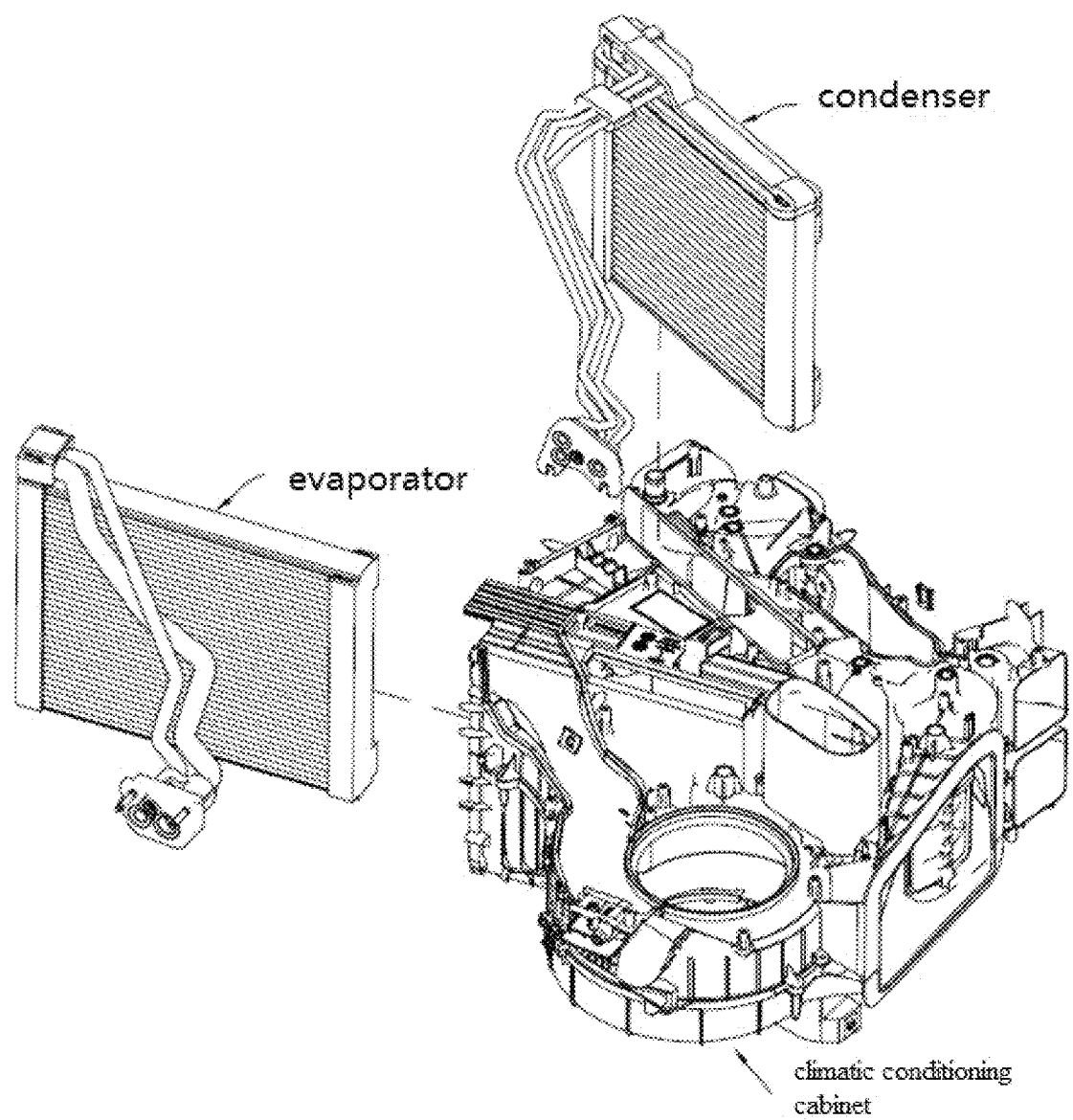
FIG. 1 is a schematic assembly diagram of an evaporator and a condenser on a climatic conditioning cabinet in an embodiment of the present application.

With reference to FIG. 1, an evaporator is horizontally mounted in a climatic conditioning cabinet, and a condenser is vertically mounted in the climatic conditioning cabinet.

Figure 2:
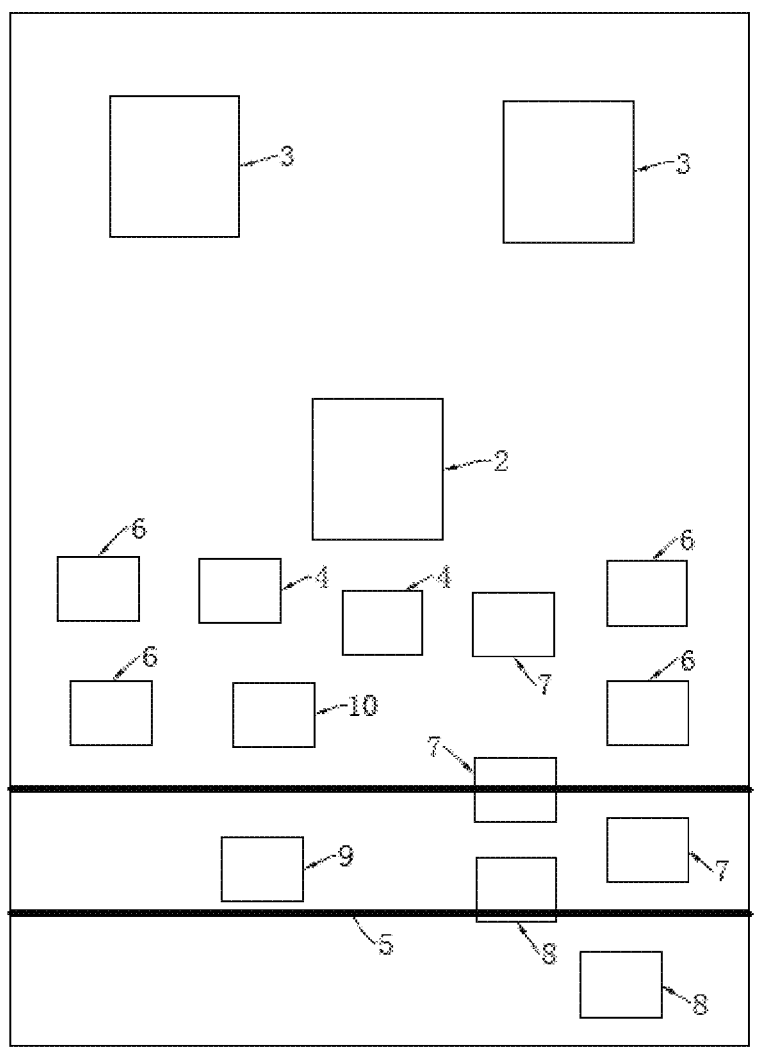
FIG. 2 is a schematic view showing an overall structure of the assembly station for evaporator and condenser on a climatic conditioning cabinet in an embodiment of the present application.

With reference to FIG. 2, the assembly station and process for evaporator and condenser on the climatic conditioning cabinet includes an operation frame body and a manipulator 2, a material rack 3, a secondary positioning assembly 4, an assembly line 5, a feeding assembly 6, an assembly unit for evaporator 7, a guide unit for evaporator 8, a guide unit for condenser 9 and a connection assembly for pipe heads of the evaporator and condenser 10 in the operation frame body.

The operation frame body is mounted in a workshop and may bear all components for assembling the evaporator and condenser of an air conditioner and achieve the modular connection with upstream and downstream assembly stations. The manipulator 2 may transfer the evaporator and the condenser, the material rack 3 may temporarily store the evaporator and the condenser, the secondary positioning assembly 4 may secondarily positioning the evaporator and the condenser, and the assembly line 5 may transport and suspend the transport of the climatic conditioning cabinet.

The feeding assembly 6 may provide pipe clamps, square nuts, bolts and hexagon nuts, where the pipe clamps, the square nuts and the bolts are used for assisting in assembling the evaporator, while the hexagon nuts are used for achieving connection between pipe joints of the evaporator and condenser. The assembly unit for evaporator may be configured to assemble the pipe clamps, the square nuts and the bolts and assist in assembling the evaporator, and the guide unit for evaporator 8 may guide the evaporator when the evaporator is assembled. The guide unit for condenser 9 may guide the condenser when the condenser is assembled, and the connection assembly for pipe heads of the evaporator and condenser 10 may achieve a connection between the pipe heads of the evaporator and the condenser.

Figure 3:
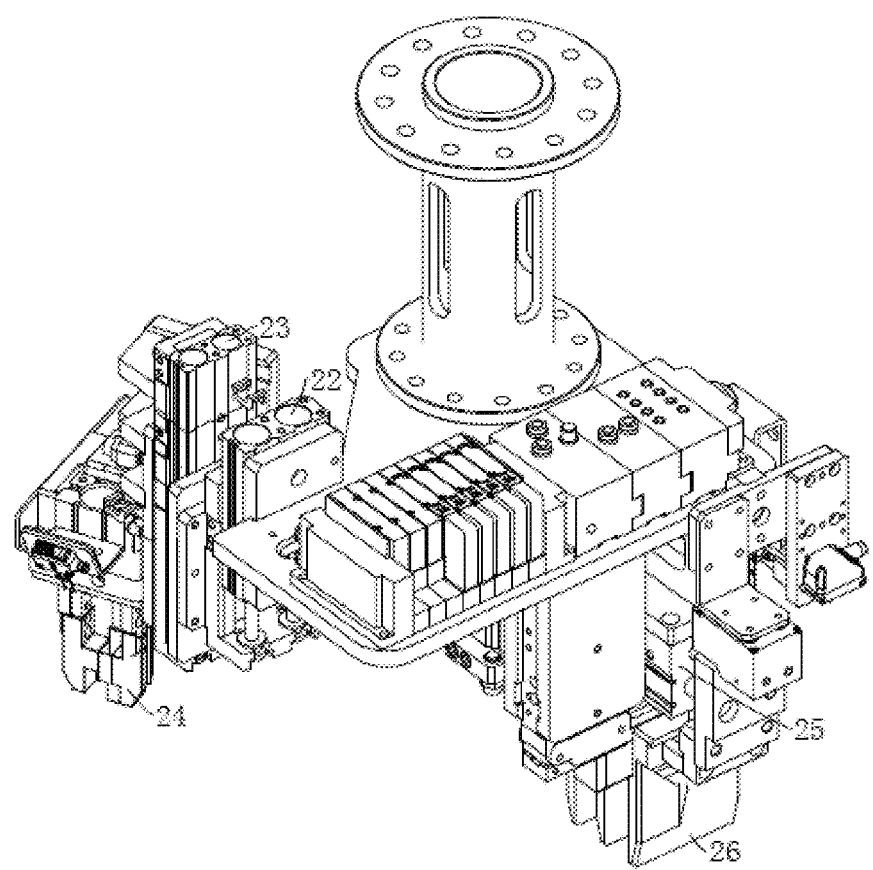
FIG. 3 is a schematic diagram showing an overall structure of a manipulator in an assembly station for evaporator and condenser on a climatic conditioning cabinet in an embodiment of the present application.

With reference to FIG. 1 and FIG. 3, the manipulator 2 includes a mechanical arm, a gripper for evaporator and a component for assembling condenser. The mechanical arm is installed in the middle of the operation frame body, an operation end of the mechanical arm is fixedly connected with a connecting sleeve, an end of the connecting sleeve away from the mechanical arm is fixedly connected with a first mounting plate, and both the gripper for evaporator and the component for assembling condenser are disposed on the first mounting plate.

The gripper for evaporator includes a first air cylinder 22, a second air cylinder 23 and a first clamping jaw 24. The first air cylinder 22 is fixedly connected to the first mounting plate, the second air cylinder 23 is fixedly connected to a telescopic end of the first air cylinder 22, and the first air cylinder 22 is perpendicular to the second air cylinder 23. The first clamping jaw 24 is fixedly connected to a telescopic end of the second air cylinder 23. In the present application, the evaporator is horizontally inserted in the climatic conditioning cabinet. When the evaporator is gripped, the mechanical arm moves to a corresponding position, the telescopic end of the first air cylinder 22 moves, so that the first clamping jaw 24 extends out in one direction, while the telescopic end of the second air cylinder 23 moves, so that the first clamping jaw 24 extends out in another direction perpendicular to the one direction, such that the evaporator is gripped by the first clamping jaw 24.

The component for assembling condenser includes a third air cylinder 25 and a second clamping jaw 26. The third air cylinder 25 is fixedly connected to the first mounting plate, and the second clamping jaw 26 is fixedly connected to a telescopic end of the third air cylinder 25. In the present application, the condenser is vertically inserted in the climatic conditioning cabinet. When the condenser is gripped, the mechanical arm moves to a corresponding position, the telescopic end of the third air cylinder 25 moves, so that the second clamping jaw 26 extends out, such that the condenser is gripped by the second clamping jaw 26.

With reference to FIG. 2, the material rack 3 includes a rack for evaporator and a rack for condenser, and both the rack for evaporator and the rack for condenser are located at one end of the operation frame body. The evaporator is temporarily stored on the rack for evaporator, and the condenser is temporarily stored on the rack for condenser.

Figure 4:
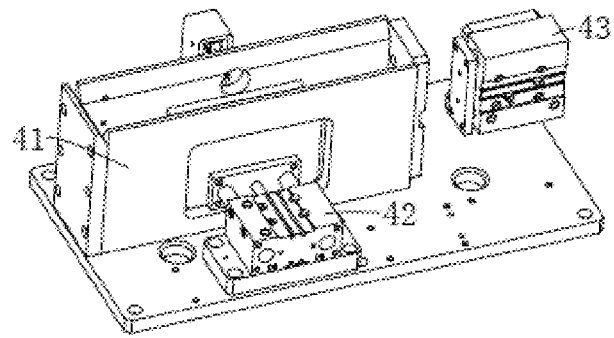
FIG. 4 is a schematic diagram showing an overall structure of a secondary positioning part for evaporator in an assembly station for evaporator and condenser on a climatic conditioning cabinet in an embodiment of the present application.
Figure 5:
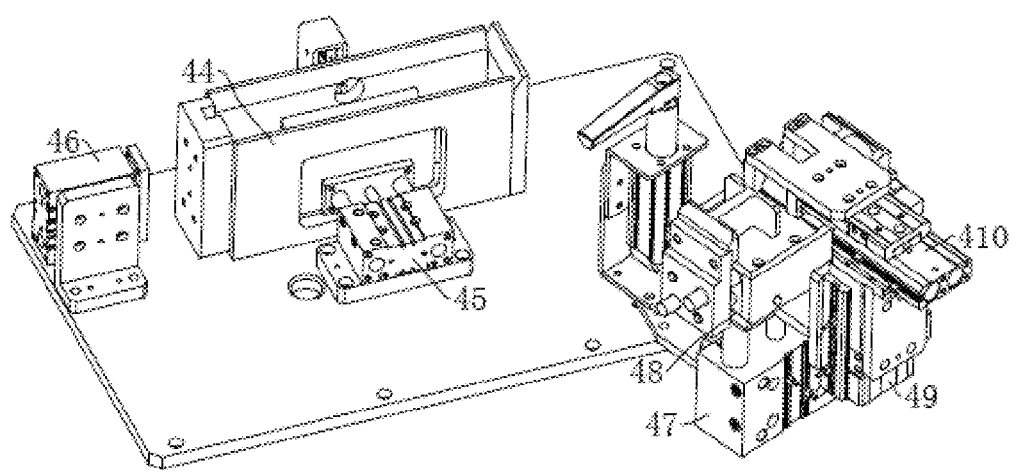
FIG. 5 is a schematic diagram showing an overall structure of a secondary positioning part for condenser in an assembly station for evaporator and condenser on a climatic conditioning cabinet in an embodiment of the present application.

With reference to FIG. 1, FIG. 4 and FIG. 5, the secondary positioning assembly 4 includes a secondary positioning part for evaporator and a secondary positioning part for condenser that are disposed on the operation frame body, and the secondary positioning part for evaporator and the secondary positioning part for condenser are located between the mechanical arm and the assembly line 5. By means of the first clamping jaw 24, the evaporator may be placed on the secondary positioning part for evaporator for secondary positioning, after that the first clamping jaw 24 clamps the evaporator for assembly, such that the assembly accuracy of the evaporator is effectively improved. By means of the second clamping jaw 26, the condenser may be placed on the secondary positioning part for condenser for secondary positioning, after that, the second clamping jaw 26 clamps the condenser for assembly, such that the assembly accuracy of the condenser is effectively improved.

With reference to FIG. 4, the secondary positioning part for evaporator includes a first positioning support plate, a first positioning frame 41, a fourth air cylinder 42 and a fifth air cylinder 43. The first positioning support frame is fixedly connected to the operation frame body in horizontal direction, the first positioning frame 41 is mounted on the first positioning support plate, the fourth air cylinder 42 is mounted on one side of the first positioning support plate, the fifth air cylinder 43 is mounted on one end of the first positioning support plate, and telescopic ends of both the fourth air cylinder 42 and the fifth air cylinder 43 face the first positioning frame 41. After the evaporator is placed on the first positioning frame 41 by the first clamping jaw 24, the telescopic ends of both the fourth air cylinder 42 and the fifth air cylinder 43 may abut against the evaporator, respectively, thereby positioning the evaporator.

With reference to FIG. 5, the secondary positioning part for condenser includes a second positioning support plate, a second positioning frame 44, a sixth air cylinder 45, a seventh air cylinder 46, an eighth air cylinder 47, a ninth air cylinder 48, a tenth air cylinder 49, an eleventh air cylinder 410 and a cylinder for supporting middle section of pipe. The second positioning support plate is fixedly connected to the operation frame body in horizontal direction, the second positioning frame 44 is mounted on the second positioning support plate, the sixth air cylinder 45 is mounted on one side of the second positioning support plate, the seventh air cylinder 46 is mounted on one end of the second positioning support plate, and telescopic ends of both the sixth air cylinder 45 and the seventh air cylinder 46 face the second positioning frame 44. The cylinder for supporting middle section of pipe extends vertically upwards and is fixedly connected to the second positioning support plate, a telescopic end of the cylinder for supporting middle section of pipe is horizontally connected with a support plate, and the support plate is configured for supporting and limiting the middle section of a pipe of the condenser.

Both the eighth air cylinder 47 and the tenth air cylinder 49 are fixedly connected to the second positioning support plate by a support frame, and telescopic ends of the eighth air cylinder 47 and the tenth air cylinder 49 are upward. The ninth air cylinder 48 is fixedly connected to the telescopic end of the eighth air cylinder 47, the eleventh air cylinder 410 is fixedly connected to the telescopic end of the tenth air cylinder 49. Telescopic ends of both the ninth air cylinder 48 and the eleventh air cylinder 410 extend horizontally toward the second positioning frame 44, and each of the both is provided with a positioning block.

After the condenser is placed on the second positioning frame 44 by the second clamping jaw 26, the telescopic ends of the sixth air cylinder 45 and the seventh air cylinder 46 extend out, thereby positioning the condenser. The telescopic ends of the eighth air cylinder 47 and the tenth air cylinder 49 retract, while the telescopic ends of the ninth air cylinder 48 and the eleventh air cylinder 410 extend out, which may limit the pipe head of the condenser, thereby positioning the pipe head of the condenser.

With reference to FIG. 2, the feeding assembly 6 includes a vibration feeding part for pipe clamp, a vibration feeding part for square nut, a vibration feeding part for bolt and a vibration feeding part for hexagon nut that are disposed on the operation frame body. The vibration feeding part for pipe clamp may convey pipe clamps, the vibration feeding part for square nut may convey square nuts, the vibration feeding part for bolt may convey bolts, and the vibration feeding part for hexagon nut may convey hexagon nuts.

Figure 6:
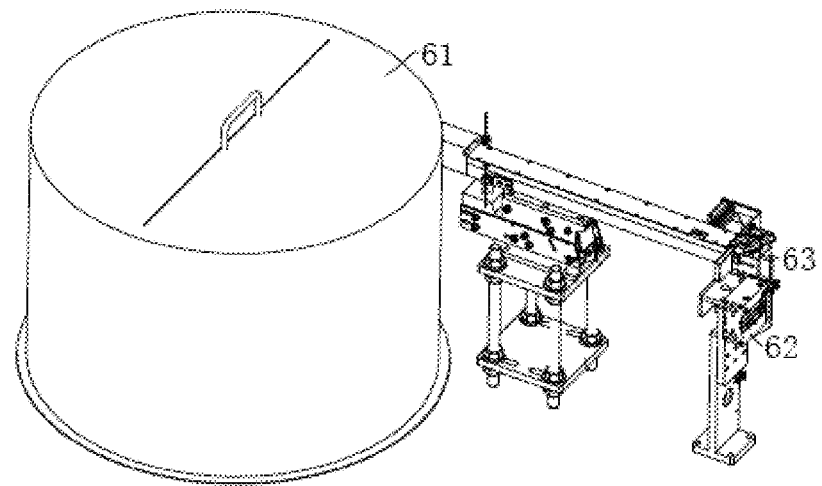
FIG. 6 is a schematic diagram showing an overall structure of a vibration feeding part for pipe clamp in an assembly station for evaporator and condenser on a climatic conditioning cabinet in an embodiment of the present application.

With reference to FIG. 6, the vibration feeding part for pipe clamp includes a vibration disk for pipe clamp 61, a twelfth air cylinder 62 and a thirteenth air cylinder 63. The vibration disk for pipe clamp 61 is fixedly connected to the operation frame body, and the twelfth air cylinder 62 is fixedly connected to the operation frame body and is located on a distribution end of the vibration disk for pipe clamp 61. The thirteenth air cylinder 63 is fixedly connected to a telescopic end of the twelfth air cylinder 62, and a telescopic end of the thirteenth air cylinder 63 is fixedly connected with a first limiting block. With the vibration disk for pipe clamp 61, the pipe clamps may be transported to the distribution end vibratingly, and then, the pipe clamps may be conveyed to a defined position by extension or retraction of the telescopic ends of the twelfth air cylinder 62 and the thirteenth air cylinder 63.

Figure 7:
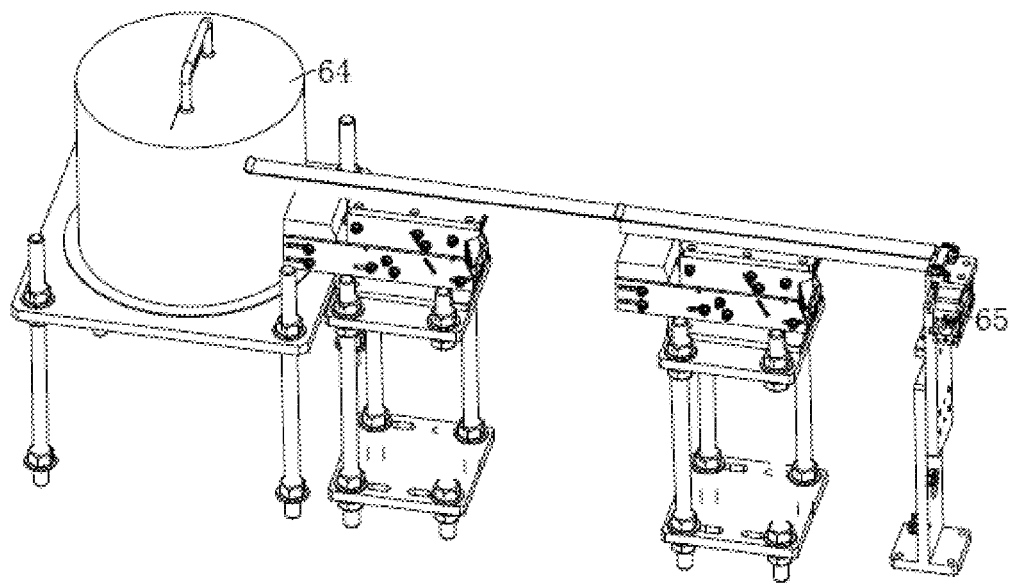
FIG. 7 is a schematic diagram showing the overall structure of a vibration feeding part for square nut in an assembly station for evaporator and condenser on a climatic conditioning cabinet in an embodiment of the present application.

With reference to FIG. 7, the vibration feeding part for square nut includes a vibration disk for square nut 64 and a fourteenth air cylinder 65. The vibration disk for square nut 64 is fixedly connected to the operation frame body, the fourteenth air cylinder 65 is fixedly connected to a distribution end of the vibration disk for square nut 64 by a support frame, and a telescopic end of the fourteenth air cylinder 65 is fixedly connected with a second limiting block. The telescopic end of the fourteenth air cylinder 65 may block the distribution end of the vibration disk for square nut 64 when extending out, thereby suspending the supply of the square nuts.

Figure 8:
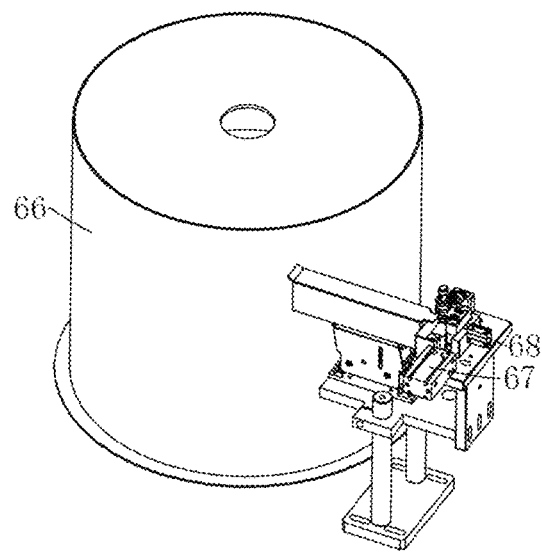
FIG. 8 is a schematic diagram showing the overall structure of a vibration feeding part for bolt in an assembly station for evaporator and condenser on a climatic conditioning cabinet in an embodiment of the present application.

With reference to FIG. 8, the vibration feeding part for bolt includes a vibration disk for bolt 66, a fifth air cylinder 67 and a sixth air cylinder 68. The vibration disk for bolt 66 is fixedly connected to the operation frame body, and the fifth air cylinder 67 is fixedly connected to the operation frame body and is located on a distribution end of the vibration disk for bolt 66. The sixth air cylinder 68 is fixedly connected to a telescopic end of the fifth air cylinder 67, and a telescopic end of the sixth air cylinder 68 is fixedly connected with a third limiting block. With the vibration disk for bolt, the bolts may be conveyed to the distribution end vibratingly, and then, the bolts may be conveyed to a defined position by extension or retraction of the telescopic ends of the fifth air cylinder 67 and the sixth air cylinder 68.

Figure 9:
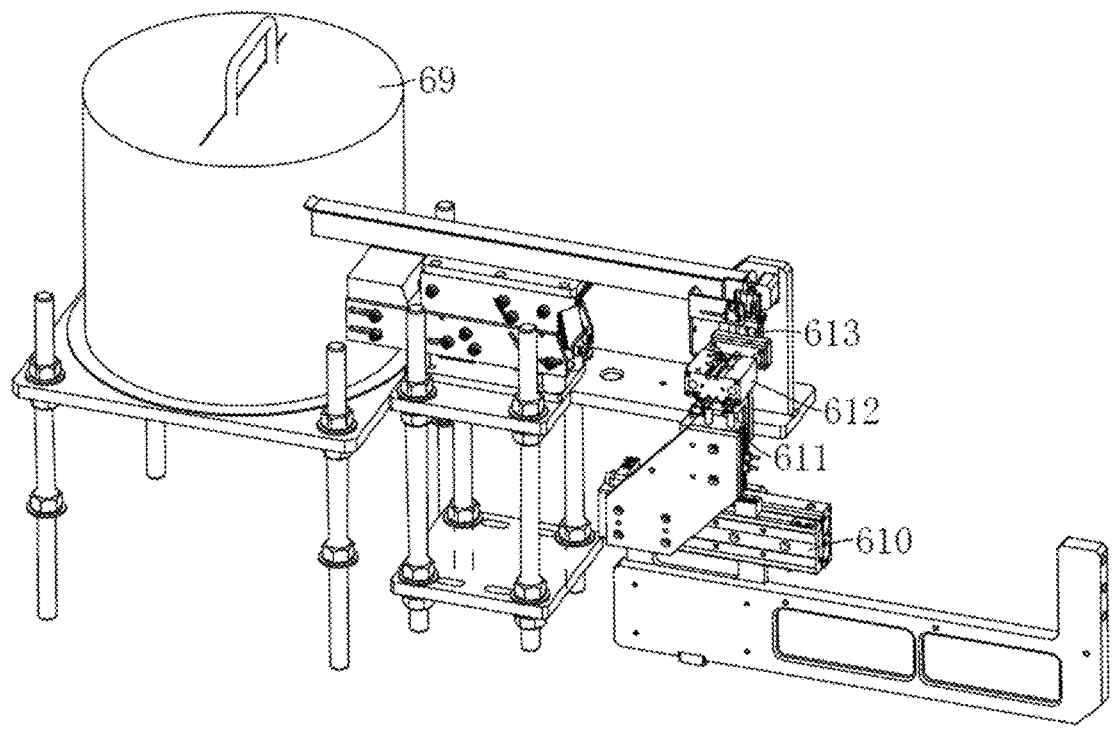
FIG. 9 is a schematic diagram showing the overall structure of a vibration feeding part for hexagon nut in an assembly station for evaporator and condenser on a climatic conditioning cabinet in an embodiment of the present application.

With reference to FIG. 9, the vibration feeding part for hexagon nut includes a vibration disk for hexagon nut 69, a seventeenth air cylinder 610, an eighteenth air cylinder 611, a nineteenth air cylinder 612 and a twentieth air cylinder 613. The vibration disk for hexagon nut 69 is fixedly connected to the operation frame body, the seventeenth air cylinder 610 is fixedly connected to the operation frame body by a support frame in horizontal direction and is parallel to a distribution end of the vibration disk for hexagon nut 69. The eighteenth air cylinder 611 is fixedly connected to a telescopic end of the seventeenth air cylinder 610, the nineteenth air cylinder 612 is fixedly connected to a telescopic end of the eighteenth air cylinder 611, the twentieth air cylinder 613 is fixedly connected to a telescopic end of the nineteenth air cylinder 612, and a telescopic end of the twentieth air cylinder 613 is fixedly connected with a fourth limiting block. Moreover, the eighteenth air cylinder 611 and the twentieth air cylinder 613 extend vertically upwards while the nineteenth air cylinder 612 extends horizontally, and the fourth limiting block is located on the distribution end of the vibration disk for hexagon nut 69. When the telescopic ends of the seventeenth air cylinder 610 and the eighteenth air cylinder 611 move and the telescopic ends of the nineteenth air cylinder 612 and the twentieth air cylinder 613 extend out, the fourth limiting block may be controlled to move, so as to provide hexagon nuts.

With reference to FIG. 2, the assembly unit for evaporator 7 includes a first auxiliary assembly part for evaporator, an assembly part for evaporator and a second auxiliary assembly part for evaporator that are disposed on the operation frame body. By means of the first auxiliary assembly part for evaporator, the square nuts may be installed on the bolts, respectively. The assembly part for evaporator may assist in assembling the evaporator on the climatic conditioning cabinet. By means of the second auxiliary assembly part for evaporator, the fixtures may be mounted and the bolts may be fixed on the fixtures.

Figure 10:
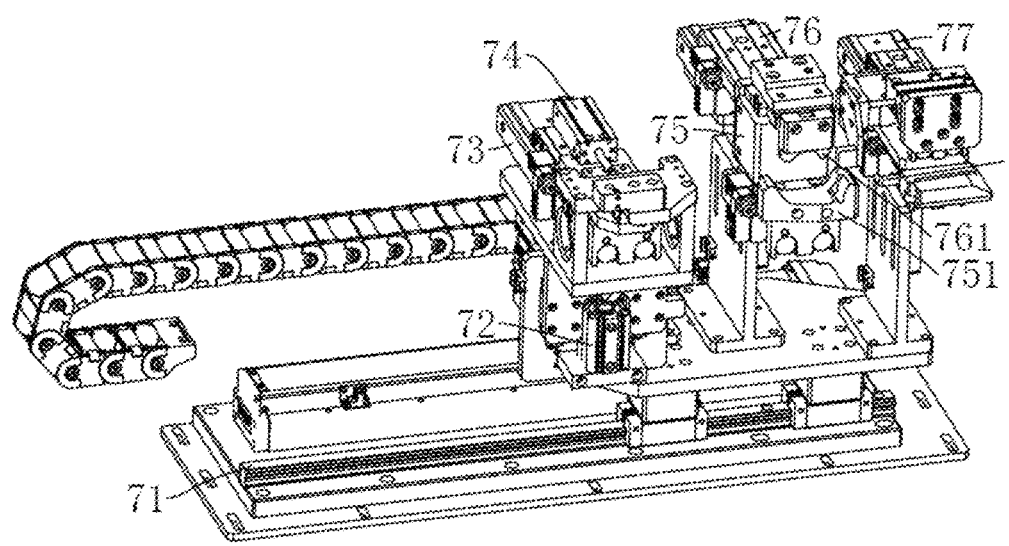
FIG. 10 is a schematic diagram showing the overall structure of a first auxiliary assembly part for evaporator in an assembly station for evaporator and condenser on a climatic conditioning cabinet in an embodiment of the present application.

With reference to FIG. 10, the first auxiliary assembly part for evaporator includes a first linear guide rail 71, a twenty-first air cylinder 72, a second linear guide rail 73, a twenty-second air cylinder 74, a third linear guide rail 75, a twenty-third air cylinder 76 and a fourth linear guide rail 77. The first linear guide rail 71 is fixedly connected to the operation frame body and is located on one side of the assembly line 5, a slider of the first linear guide rail 71 is provided with a second mounting plate, the twenty-first air cylinder 72 is fixedly connected to the second mounting plate in a vertical direction, and there may be a plurality of twenty-first air cylinders 72. The second linear guide rail 73 extends horizontally toward the assembly line 5 and is fixed to a telescopic end of the twenty-first air cylinder 72, the twenty-second air cylinder 74 is fixedly connected to a slider of the second linear guide rail 73 in a horizontal direction, and a telescopic end of the twenty-second air cylinder 74 is fixedly connected with a stopper for nut. The position of the second linear guide rail 73 may be controlled by the sliding of the slider of the first linear guide rail 71 and the extension or retraction of the telescopic end of the twenty-first air cylinder 72, and then, the telescopic end of the twenty-second air cylinder 74 extends out, so as to limit the square nuts by the stopper for nut, to facilitate gripping the square nuts.

The third linear guide rail 75 is fixedly connected to the second mounting plate by a support frame, and an end of a body of the third linear guide rail 75 close to the assembly line 5 is fixedly connected with a first lower clamping block 751. A slider of the third linear guide rail 75 is fixedly connected with the twenty-third air cylinder 76, and a telescopic end of the twenty-third air cylinder 76 extends downward and is fixedly connected with a first upper clamping block 761. When the slider of the third linear guide rail 75 slides, the position of the twenty-third air cylinder 76 may be adjusted. When the evaporator is installed on the climatic conditioning cabinet, the telescopic end of the twenty-third air cylinder 76 moves downwards, such that the shell of the evaporator and the shell of the climatic conditioning cabinet may be clamped with the first lower clamping block 751 and the first upper clamping block 761. The fourth linear guide rail 77 is fixedly connected to the second mounting plate by a support frame in horizontal direction, and a slider of the fourth linear guide rail 77 is fixedly connected with a guide head. The slider of the fourth linear guide rail 77 may guide the pipe head of the evaporator when extending out.

Figure 11:
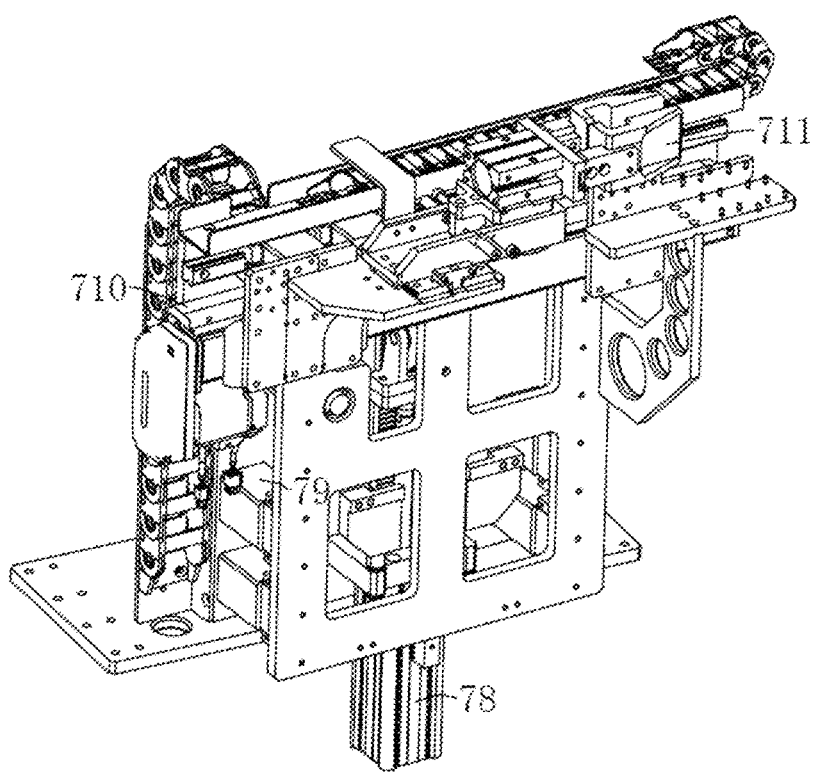
FIG. 11 is a schematic diagram showing the overall structure of an assembly part for evaporator in an assembly station for evaporator and condenser on a climatic conditioning cabinet in an embodiment of the present application.
Figure 12:
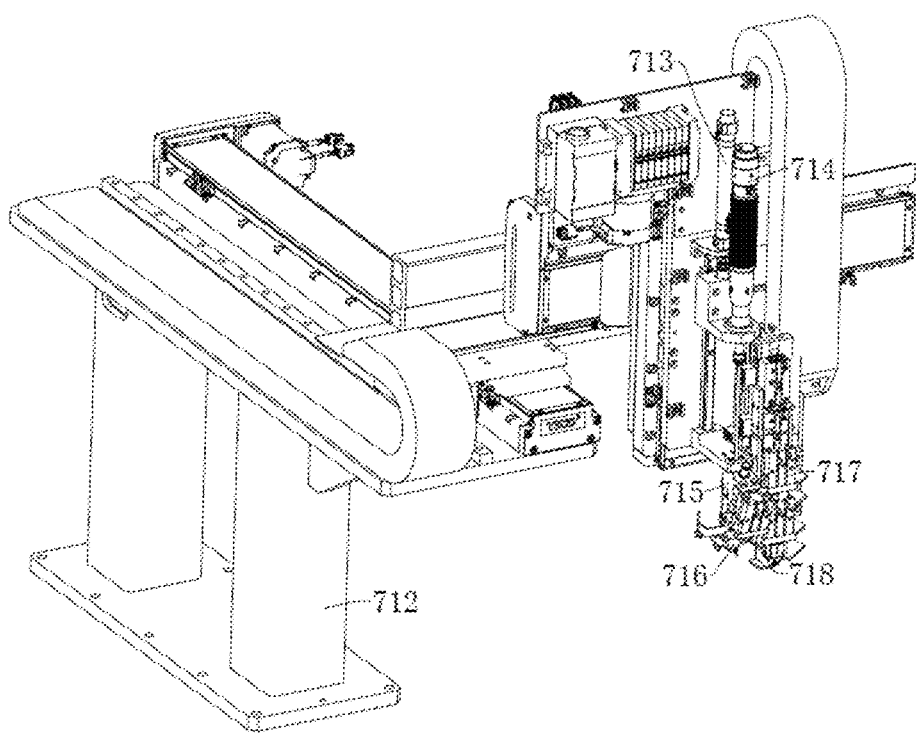
FIG. 12 is a schematic diagram showing the overall structure of a second auxiliary assembly part for evaporator in an assembly station for evaporator and condenser on a climatic conditioning cabinet in an embodiment of the present application.

With reference to FIG. 11, the assembly part for evaporator includes a twenty-fourth air cylinder 78, a twenty-fifth air cylinder 79, a twenty-sixth air cylinder 710 and a third clamping jaw 711. The twenty-fourth air cylinder 78 extends vertically upwards and is fixedly connected to the operation frame body by a support frame, the twenty-fifth air cylinder 79 is fixedly connected to a telescopic end of the twenty-fourth air cylinder 78 in horizontal direction, the twenty-sixth air cylinder 710 is fixedly connected to a telescopic end of the twenty-fifth air cylinder 79 in horizontal direction, and the twenty-fifth air cylinder 79 and the twenty-sixth air cylinder 710 are perpendicular to each other. The third clamping jaw 711 is fixedly connected to a telescopic end of the twenty-sixth air cylinder 710. With the twenty-fourth air cylinder 78, a height of the third clamping jaw 711 may be adjusted, and with the twenty-fifth air cylinder 79 and the twenty-sixth air cylinder 710, the horizontal position of the third clamping jaw 711 may be adjusted. After the evaporator is clamped and conveyed to the third clamping jaw 711 by the first clamping jaw 24, the third clamping jaw 711 may clamp the evaporator, then, the first clamping jaw 24 is released and withdrawn, and the twenty-sixth air cylinder 710 extends out, so as to push the evaporator into the climatic conditioning cabinet.

With reference to FIG. 2, the guide unit for evaporator 8 includes a vertical guide part and a lateral guide part that are disposed on the operation frame body. The vertical guide part may limit and guide the upper side and lower side of the evaporator when the evaporator is installed in the climatic conditioning cabinet, and the lateral guide part may limit and guide one side of the evaporator. Moreover, the vertical guide part and the lateral guide part are located on two opposite sides of the assembly line 5, respectively.

Figure 13:
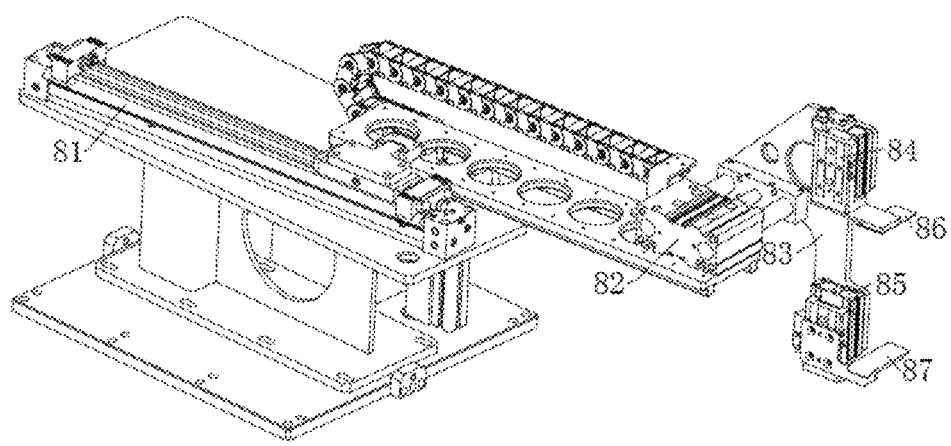
FIG. 13 is a schematic diagram showing the overall structure of a vertical guide part in an assembly station for evaporator and condenser on a +climatic conditioning cabinet in an embodiment of the present application.

With reference to FIG. 13, the vertical guide part includes a fifth linear guide rail 81, a thirtieth air cylinder 82, a positioning plate 83, a thirty-first air cylinder 84, a thirty-second air cylinder 85, an upper guide plate 86 and a lower guide plate 87. The fifth linear guide rail 81 is fixedly connected to the operation frame body in horizontal direction and extends toward the assembly line 5. The thirtieth air cylinder 82 is fixedly connected to a slider of the fifth linear guide rail 81, and the extension or retraction direction of a telescopic end of the thirtieth air cylinder 82 is perpendicular to the glide direction of the slider of the fifth linear guide rail 81. The positioning plate 83 is fixedly connected to the telescopic end of the thirtieth air cylinder 82 in vertical direction. The thirty-first air cylinder 84 and the thirty-second air cylinder 85 are fixedly connected to the upper end and lower end of the positioning plate 83 symmetrically. The upper guide plate 86 is fixedly connected to a telescopic end of the thirty-first air cylinder 84, and the lower guide plate 87 is fixedly connected to a telescopic end of the thirty-second air cylinder 85. The upper guide plate 86 and the lower guide plate 87 may be close to or away from each other by the extension or retraction of the telescopic ends of the thirty-first air cylinder 84 and the thirty-second air cylinder 85. When the evaporator is horizontally installed, the slider of the fifth linear guide rail 81 slides towards the assembly line 5, the telescopic end of the thirtieth air cylinder 82 extends out, and the upper guide plate 86 and the lower guide plate 87 limit and abut against the upper side and lower side of the evaporator, respectively, by which the evaporator may be limited, thereby ensuring the assembly accuracy of the evaporator.

Figure 14:
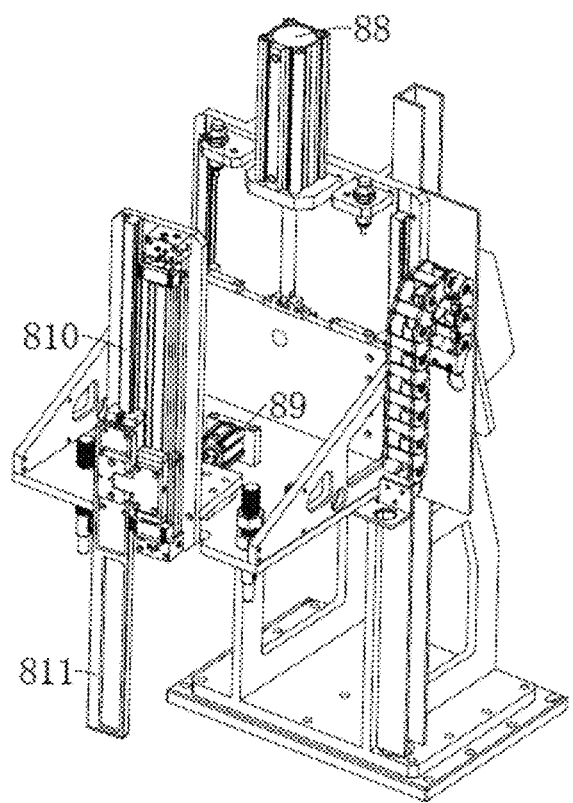
FIG. 14 is a schematic diagram showing the overall structure of a lateral guide part in an assembly station for evaporator and condenser on a climatic conditioning cabinet in an embodiment of the present application.

With reference to FIG. 14, the lateral guide part includes a thirty-third air cylinder 88, a thirty-fourth air cylinder 89, a sixth linear guide rail 810 and a lateral guide plate 811. The thirty-third air cylinder 88 extends vertically downwards and fixedly connected to the operation frame body by a support frame, and the thirty-fourth air cylinder 89 is fixedly connected to a telescopic end of the thirty-third air cylinder 88 in horizontal direction by the support frame, and the thirty-fourth air cylinder 89 extends toward the assembly line 5. The sixth linear guide rail 810 is fixedly connected to a telescopic end of the thirty-fourth air cylinder 89 in vertical direction by the support frame, and the lateral guide plate 811 is fixedly connected to a slider of the sixth linear guide rail 810. When the evaporator is installed, the telescopic end of the thirty-third air cylinder 88 retracts while the telescopic end of the thirty-fourth air cylinder 89 extends out, such that the slider of the sixth linear guide rail 810 drives the lateral guide plate 811 to slide, such that the lateral guide plate 811 guides and abuts against a side wall at one side of the evaporator, thereby improving the assembly accuracy of the evaporator.

Figure 15:
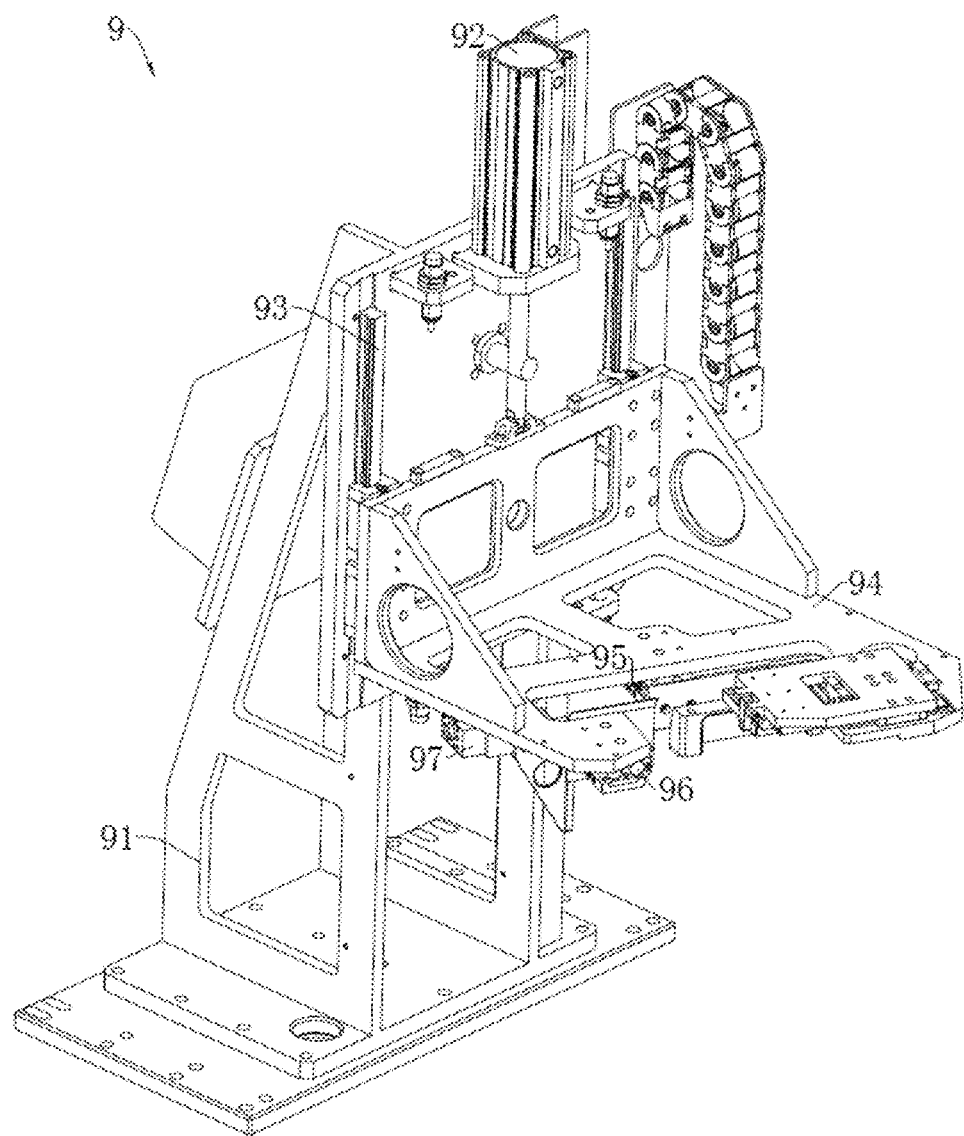
FIG. 15 is a schematic diagram showing the overall structure of a guide unit for condenser in an assembly station for evaporator and condenser on a climatic conditioning cabinet in an embodiment of the present application.

With reference to FIG. 15, the guide unit for condenser 9 includes a slide guide rack 91, a thirty-fifth air cylinder 92, two seventh linear guide rails 93, a slide guide plate 94 and a guide portion. The slide guide rack 91 is fixedly connected to the operation frame body, the thirty-fifth air cylinder 92 is fixedly connected to the top of the slide guide rack 91 and a telescopic end thereof is downward. The two seventh linear guide rails 93 are fixedly connected to two sides of the slide guide rack 91 in vertical direction, respectively. The slide guide plate 94 is fixedly connected to two sliders of the two seventh linear guide rails 93 in horizontal direction. The slide guide plate 94 is configured with a guide notch shaped like an opening, and the guide portion is disposed on an edge of the guide notch.

The guide portion includes a thirty-sixth air cylinder 95, a thirty-seventh air cylinder 96 and a thirty-eighth air cylinder 97 that are fixedly connected to the slide guide plate 94, the thirty-sixth air cylinder 95 and the thirty-seventh air cylinder 96 are located on two sides of the guide notch, respectively, the thirty-eighth air cylinder 97 is located on one end of the guide notch, and telescopic ends of the thirty-sixth air cylinder 95, the thirty-seventh air cylinder 96 and the thirty-eighth air cylinder 97 are fixedly connected with the guide plates for condenser, respectively.

When the condenser is vertically installed by the second clamping jaw 26, a telescopic end of the thirty-fifth air cylinder 92 moves downwards, such that the sliders of the two seventh linear guide rails 93 move downwards, so as to drive the slide guide plate 94 to move close to the climatic conditioning cabinet. Then, the thirty-sixth air cylinder 95, the thirty-seventh air cylinder 96 and the thirty-eighth air cylinder 97 drive the plurality of guide plates for condenser to extend out, such that the guide plates for condenser abut against the condenser, thereby guiding the condenser to ensure the assembly accuracy of the condenser.

Figure 16:
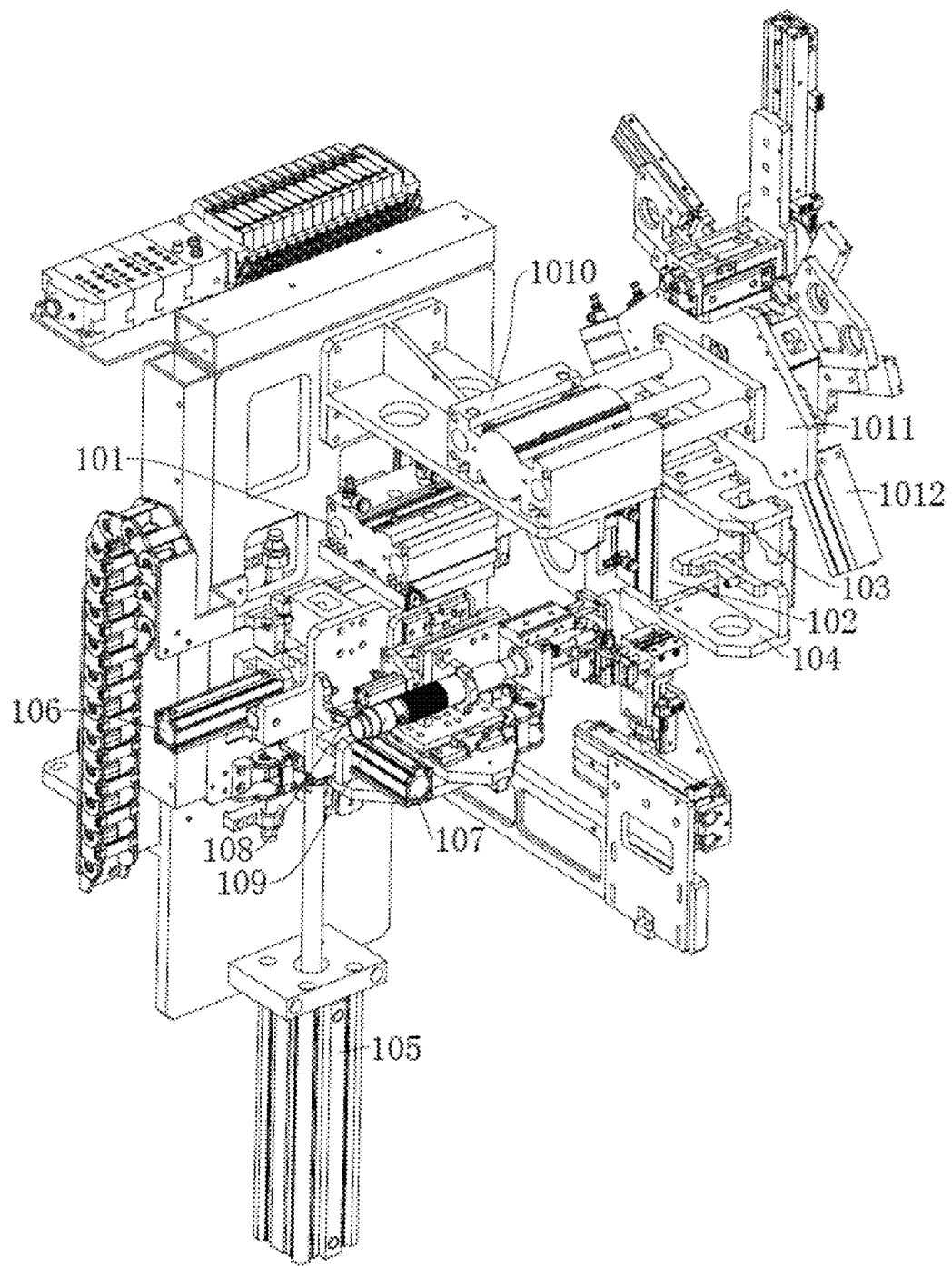
FIG. 16 is a schematic diagram showing the overall structure of a connection assembly for pipe heads of the evaporator and condenser in an assembly station for evaporator and condenser on a climatic conditioning cabinet in an embodiment of the present application.

With reference to FIG. 16, the connection assembly for pipe heads of the evaporator and condenser 10 includes a support frame body, a pipe clamping element of the evaporator and condenser, a hexagon nut tightening unit and a compression element for sponge. Both the support frame body and the hexagon nut tightening unit are mounted on the operation frame body, and the pipe clamping element of the evaporator and condenser and the compression element for sponge are disposed on the support frame body. The pipe clamping element of the evaporator and condenser may clamp the pipes of the evaporator and the condenser, the hexagon nut tightening unit may tighten the hexagon nuts for connecting the pipe heads of the evaporator and the condenser, and the compression element for sponge may compress a sponge, against the pipe heads of the evaporator and the condenser.

The pipe clamping element of the evaporator and condenser includes a thirty-ninth air cylinder 101, a fortieth air cylinder 102, a second upper clamping block 103 and a second lower clamping block 104. The thirty-ninth air cylinder 101 is fixedly connected to the support frame body in horizontal direction, and the fortieth air cylinder 102 extends vertically downwards and is fixedly connected to a telescopic end of the thirty-ninth air cylinder 101. The second upper clamping block 103 is fixedly connected to a cylinder body of the fortieth air cylinder 102, and the second lower clamping block 104 is fixedly connected to a telescopic end of the fortieth air cylinder 102. When the telescopic end of the thirty-ninth air cylinder 101 extends out, the fortieth air cylinder 102 may extend out. When the telescopic end of the fortieth air cylinder 102 retracts, the second upper clamping block 103 and the second lower clamping block 104 may move close to each other, so as to clamp the pipes of the evaporator and the condenser, to facilitate tightening the hexagon nuts and sticking the sponge.

The hexagon nut tightening unit includes a forty-first air cylinder 105, a forty-second air cylinder 106, a forty-third air cylinder 107, a forty-fourth air cylinder 108 and a second screw gun 109. The forty-first air cylinder 105 extends vertically upwards and is fixedly connected to the operation frame body, the forty-second air cylinder 106 is fixedly connected to a telescopic end of the forty-first air cylinder 105 in horizontal direction by a support frame, and the forty-second air cylinder 106 extends toward the assembly line 5. The forty-third air cylinder 107 is fixedly connected to a telescopic end of the forty-second air cylinder 106 in horizontal direction, and the forty-third air cylinder 107 and the forty-second air cylinder 106 are perpendicular to each other. The forty-fourth air cylinder 108 is fixedly connected to a telescopic end of the forty-third air cylinder 107 and extends toward the assembly line 5. The extension or retraction direction of a telescopic end of the forty-fourth air cylinder 108 is consistent with the extension or retraction direction of the telescopic end of the thirty-ninth air cylinder 101. The second screw gun 109 is fixedly connected to the telescopic end of the forty-fourth air cylinder 108 by the support frame. When the telescopic ends of the forty-first air cylinder 105, the forty-second air cylinder 106, the forty-third air cylinder 107 and the forty-fourth air cylinder 108 extend out or retract, the position of the second screw gun 109 may be correspondingly adjusted, so as to tighten the hexagon nuts.

Based on the same concept, the present application further provides an assembly process for evaporator and condenser on a climatic conditioning cabinet.

The assembly process for evaporator and condenser on the climatic conditioning cabinet includes the following steps:

After the climatic conditioning cabinet is conveyed to a station by an assembly line 5, square nuts are provided by a vibration feeding part for square nut, and the square nuts are mounted on the climatic conditioning cabinet by a fifth clamping jaw 718. Then, a first clamping jaw 24 on a mechanical arm clamps an evaporator to a secondary positioning part for evaporator for secondary positioning, and then clamps the evaporator and conveys it to an assembly part for evaporator, which then pushes the evaporator horizontally into the climatic conditioning cabinet, where the evaporator is guided by a plurality of auxiliary assembly parts for evaporator in the pushing process.

Then, pipe clamps are provided by a vibration feeding part for pipe clamp, then, bolts are driven into the climatic conditioning cabinet by a first screw gun 714, so that a pipe of the evaporator is positioned by the pipe clamps. Then, a second clamping jaw 26 on the mechanical arm clamps a condenser and conveys it to a secondary positioning part for condenser for secondary positioning and then clamps and pushes the condenser into the climatic conditioning cabinet, where the condenser is guided by a guide unit for condenser 9 in the pushing process.

Then, pipes of the condenser and the evaporator are clamped by a pipe clamping element of the evaporator and condenser, hexagon nuts are mounted to the connection between the pipe heads of the evaporator and the condenser by a second screw gun 109, and then, sponge is compressed against the connection between the pipe heads of the evaporator and the condenser by a compression element for sponge.

The above descriptions are all preferred embodiments of the present application, and are not intended to limit the protection scope of the present application. Therefore, all equivalent variations made according to the structure, shape and principle of the present application shall fall within the protection scope of the present application.

LIST OF REFERENCE NUMERALS 2 manipulator
22 first air cylinder
23 second air cylinder
24 first clamping jaw
25 third air cylinder
26 second clamping jaw
3 material rack
4 secondary positioning assembly
41 first positioning frame
42 fourth air cylinder
43 fifth air cylinder
44 second positioning frame
45 sixth air cylinder
46 seventh air cylinder
47 eighth air cylinder
48 ninth air cylinder
49 tenth air cylinder
410 eleventh air cylinder
5 assembly line
6 feeding assembly
61 vibration disk for pipe clamp
62 twelfth air cylinder
63 thirteenth air cylinder
64 vibration disk for square nut
65 fourteenth air cylinder
66 vibration disk for bolt
67 fifteenth air cylinder
68 sixteenth air cylinder
69 vibration disk for hexagon bolt
610 seventeenth air cylinder
611 eighteenth air cylinder
612 nineteenth air cylinder
613 twentieth air cylinder
7 assembly unit for evaporator
71 first linear guide rail
72 twenty-first air cylinder
73 second linear guide rail
74 twenty-second air cylinder
75 third linear guide rail
751 first lower clamping block
76 twenty-third air cylinder
761 first upper clamping block
77 fourth linear guide rail
78 twenty-fourth air cylinder
79 twenty-fifth air cylinder
710 twenty-sixth air cylinder
711 third clamping jaw
712 auxiliary frame
713 twenty-seventh air cylinder
714 first screw gun
715 twenty-eighth air cylinder
716 fourth clamping jaw
717 twenty-ninth air cylinder
718 fifth clamping jaw
8 guide unit for evaporator
81 fifth linear guide rail
82 thirtieth air cylinder
83 positioning plate
84 thirty-first air cylinder
85 thirty-second air cylinder
86 upper guide plate
87 lower guide plate
88 thirty-third air cylinder
89 thirty-fourth air cylinder
810 sixth linear guide rail
811 lateral guide plate
9 guide unit for condenser
91 slide guide rack
92 thirty-fifth air cylinder
93 seventh linear guide rail
94 slide guide plate
95 thirty-sixth air cylinder
96 thirty-seventh air cylinder
97 thirty-eighth air cylinder
10 connection assembly for pipe heads of the evaporator and condenser
101 thirty-ninth air cylinder
102 fortieth air cylinder
103 second upper clamping block
104 second lower clamping block
105 forty-first air cylinder
106 forty-second air cylinder
107 forty-third air cylinder
108 forty-fourth air cylinder
109 second screw gun
1010 forty-fifth air cylinder
1011 triangular plate
1012 forty-sixth air cylinder.

What is claimed is:

1. An assembly station for evaporator and condenser on a climatic conditioning cabinet, comprising an operation frame body, a manipulator, an assembly line, an assembly part for evaporator, and a connection assembly for a pipe head of the evaporator and a pipe head of the condenser, wherein the manipulator, the assembly line, the assembly part for evaporator, and the connection assembly for the pipe head of the evaporator and the pipe head of the condenser are provided on the operation frame body, wherein the manipulator comprises a mechanical arm on the operation frame body, a gripper for evaporator and a component for assembling condenser, the gripper for evaporator and the component for assembling condenser are provided on the mechanical arm, and the assembly line is configured to convey the climatic conditioning cabinet, wherein the connection assembly for the pipe head of the evaporator and the pipe head of the condenser comprises a pipe clamping element of the evaporator and the condenser, a hexagon nut tightening unit and a compression element for sponge, wherein the pipe clamping element of the evaporator and the condenser comprises a thirty-ninth air cylinder, a fortieth air cylinder, a second upper clamping block and a second lower clamping block, the thirty-ninth air cylinder is disposed on the operation frame body and extends toward the assembly line, the fortieth air cylinder extends vertically downwards and is disposed at a telescopic end of the thirty-ninth air cylinder, the second upper clamping block is disposed on a cylinder body of the fortieth air cylinder, the second lower clamping block is disposed at a telescopic end of the fortieth air cylinder, and the second upper clamping block and the second lower clamping block are configured to clamp a pipe of the evaporator and a pipe of the condenser, wherein the hexagon nut tightening unit comprises a forty-fourth air cylinder on the operation frame body and a second screw gun at a telescopic end of the forty-fourth air cylinder, an extension or retraction direction of the telescopic end of the forty-fourth air cylinder is configured to be consistent with an extension or retraction direction of the telescopic end of the thirty-ninth air cylinder, and the second screw gun is configured to tighten a nut on a connection between the pipe head of the evaporator and the pipe head of the condenser, and wherein the compression element for sponge is configured to compress a sponge against the connection between the pipe head of the evaporator and the pipe head of the condenser.

2. The assembly station for evaporator and condenser on the climatic conditioning cabinet according to claim 1, further comprising a vertical guide part, wherein the vertical guide part comprises a fifth linear guide rail, a thirtieth air cylinder, a positioning plate, a thirty-first air cylinder, a thirty-second air cylinder, an upper guide plate and a lower guide plate, and wherein the fifth linear guide rail is disposed on the operation frame body, the thirtieth air cylinder is disposed on a slider of the fifth linear guide rail, the positioning plate is vertically disposed at a telescopic end of the thirtieth air cylinder, the thirty-first air cylinder and the thirty-second air cylinder are symmetrically at the telescopic end of the thirtieth air cylinder, the upper guide plate and the lower guide plate are disposed at a telescopic end of the thirty-first air cylinder and a telescopic end of the thirty-second air cylinder, respectively, and the upper guide plate and the lower guide plate are configured to be movable close to or away from each other and to be in contact with an upper side and a lower side of the evaporator, respectively.

3. The assembly station for evaporator and condenser on the climatic conditioning cabinet according to claim 2, further comprising a lateral guide part, wherein the lateral guide part comprises a thirty-third air cylinder, a thirty-fourth air cylinder, a sixth linear guide rail and a lateral guide plate, and wherein the thirty-third air cylinder is vertically disposed on the operation frame body, the thirty-fourth air cylinder is horizontally disposed at a telescopic end of the thirty-third air cylinder, the sixth linear guide rail is vertically disposed at a telescopic end of the thirty-fourth air cylinder, the lateral guide plate is disposed at a slider of the sixth linear guide rail, and the lateral guide plate is configured to be in contact with a side wall of the evaporator.

4. The assembly station for evaporator and condenser on the climatic conditioning cabinet according to claim 3, further comprising a guide unit for condenser, wherein the guide unit for condenser comprises a stationary guide plate on the operation frame body, a thirty-sixth air cylinder, a thirty-seventh air cylinder and a thirty-eighth air cylinder, and the thirty-sixth air cylinder, the thirty-seventh air cylinder and the thirty-eighth air cylinder are provided on the stationary guide plate, and wherein the stationary guide plate is configured with a guide notch shaped like an opening, the thirty-sixth air cylinder and the thirty-seventh air cylinder are located on two sides of the guide notch, respectively, the thirty-eighth air cylinder is located on one end of the guide notch, and a telescopic end of the thirty-sixth air cylinder, a telescopic end of the thirty-seventh air cylinder and a telescopic end of the thirty-eighth air cylinder each is provided with a guide plate for condenser.

5. The assembly station for evaporator and condenser on the climatic conditioning cabinet according to claim 1, further comprising a secondary positioning part for evaporator, wherein the secondary positioning part for evaporator comprises a first positioning support plate on the operation frame body, a first positioning frame, a fourth air cylinder and a fifth air cylinder, the first positioning frame, the fourth air cylinder and the fifth air cylinder are provided on the first positioning support plate, the first positioning frame is configured to receive the evaporator, and the fourth air cylinder and the fifth air cylinder are configured to abut against one side and one end of the evaporator, respectively.

6. The assembly station for evaporator and condenser on the climatic conditioning cabinet according to claim 5, further comprising a secondary positioning part for condenser, wherein the secondary positioning part for condenser comprises a second positioning support plate on the operation frame body, a second positioning frame, a sixth air cylinder and a seventh air cylinder, the second positioning frame, the sixth air cylinder and the seventh air cylinder are provided on the second positioning support plate, the second positioning frame is configured to receive the condenser, and the sixth air cylinder and the seventh air cylinder are configured to abut against one side and one end of the condenser, respectively.

7. The assembly station for evaporator and condenser on the climatic conditioning cabinet according to claim 1, further comprising a rack for evaporator and a rack for condenser, wherein the rack for evaporator and the rack for condenser are disposed on the operation frame body.

8. The assembly station for evaporator and condenser on the climatic conditioning cabinet according to claim 1, wherein the assembly part for evaporator comprises a twenty-fourth air cylinder vertically disposed on the operation frame body, a twenty-fifth air cylinder horizontally disposed at a telescopic end of the twenty-fourth air cylinder, a twenty-sixth air cylinder horizontally disposed at a telescopic end of the twenty-fifth air cylinder, a third clamping jaw at a telescopic end of the twenty-sixth air cylinder, and the third clamping jaw is configured to grip the evaporator.

9. The assembly station for evaporator and condenser on the climatic conditioning cabinet according to claim 1, wherein the component for assembling condenser comprises a third air cylinder on the mechanical arm and a second clamping jaw at a telescopic end of the third air cylinder, and the second clamping jaw is configured to assemble the condenser.

10. An assembly process for evaporator and condenser on a climatic conditioning cabinet, comprising the following steps:

after conveying the climatic conditioning cabinet to an assembly station by an assembly line, providing square nuts by a vibration feeding part for square nut and mounting the square nuts on the climatic conditioning cabinet by a fifth clamping jaw, then clamping the evaporator and conveying the evaporator to a secondary positioning part for evaporator by a first clamping jaw for secondary positioning, after that, clamping the evaporator and conveying the evaporator to an assembly part for evaporator by the first clamping jaw, and then horizontally pushing the evaporator into the climatic conditioning cabinet by the assembly part for evaporator, wherein the evaporator is guided by a plurality of evaporator auxiliary assembly parts during the pushing the evaporator, providing pipe clamps by a vibration feeding part for pipe clamp, driving bolts into the climatic conditioning cabinet by a first screw gun, so that a pipe of the evaporator is positioned by the pipe clamps, then clamping the condenser and conveying the condenser to a secondary positioning part for condenser by a second clamping jaw for secondary positioning, and after that, clamping and pushing the condenser into the climatic conditioning cabinet by the second clamping jaw, wherein the condenser is guided by a guide unit for condenser during the pushing the condenser, and clamping a pipe of the condenser and the pipe of the evaporator by a pipe clamping element of the evaporator and the condenser, mounting hexagon nuts to a connection between the pipe of the evaporator and the pipe of the condenser by a second screw gun, and then compressing a sponge against the connection between the pipe of the evaporator and the pipe of the condenser by a compression element for sponge.

\* \* \* \* \*